United States Patent
Son et al.

(10) Patent No.: US 10,185,424 B2
(45) Date of Patent: Jan. 22, 2019

(54) TOUCH MEMBER AND METHOD OF MANUFACTURING THE SAME

(71) Applicant: Samsung Display Co., Ltd., Yongin-si (KR)

(72) Inventors: Jungha Son, Seoul (KR); Jaeneung Kim, Seoul (KR); Yong-hwan Ryu, Yongin-si (KR); Sangkyu Choi, Hwaseong-si (KR); Jihun Kim, Hwaseong-si (KR); Hanyung Jung, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/429,736

(22) Filed: Feb. 10, 2017

(65) Prior Publication Data

US 2017/0242515 A1 Aug. 24, 2017

(30) Foreign Application Priority Data

Feb. 19, 2016 (KR) .......................... 10-2016-0019908

(51) Int. Cl.
*G06F 3/041* (2006.01)
*G06F 3/047* (2006.01)

(52) U.S. Cl.
CPC ............ *G06F 3/0412* (2013.01); *G06F 3/047* (2013.01); *G06F 3/0416* (2013.01); *G06F 2203/04102* (2013.01); *G06F 2203/04103* (2013.01)

(58) Field of Classification Search
CPC ...... G06F 3/0412; G06F 3/0416; G06F 3/047; G06F 2203/04102; G06F 2203/04103
See application file for complete search history.

(56) References Cited

U.S. PATENT DOCUMENTS

| 9,430,072 B2 | 8/2016 | Lin et al. | |
| 2008/0236905 A1* | 10/2008 | Endo | G02F 1/13338 178/18.03 |
| 2012/0162099 A1* | 6/2012 | Yoo | G06F 3/0412 345/173 |
| 2014/0132553 A1* | 5/2014 | Park | G06F 3/044 345/174 |
| 2014/0139447 A1* | 5/2014 | Kang | G06F 3/044 345/173 |

(Continued)

FOREIGN PATENT DOCUMENTS

| KR | 10-2013-0126007 | 11/2013 |
| KR | 10-2015-0063871 | 6/2015 |

OTHER PUBLICATIONS

Yongming Sun et al., "A Bamboo-inspired Nanostructure Design fro Flexible, Foldable, and Twistable Energy Storage Devices", 2015 American Chemical Society, NANO Letters, pubs.acs.org/NanoLett 2015, vol. 15, pp. 3899-3906.

*Primary Examiner* — Tom Sheng
(74) *Attorney, Agent, or Firm* — H.C. Park & Associates, PLC

(57) ABSTRACT

Provided is a touch member includes a folding region folded around a folding axis and a non-folding region adjacent to the folding region. The touch member includes a first conductive pattern disposed in the folding region and a second conductive pattern disposed in the non-folding region. The touch member also includes an air gap defined inside the first conductive pattern. The touch member is configured to detect an external signal.

20 Claims, 17 Drawing Sheets

(56) References Cited

U.S. PATENT DOCUMENTS

| | | | | |
|---|---|---|---|---|
| 2014/0145977 | A1* | 5/2014 | Kang | G06F 3/044 |
| | | | | 345/173 |
| 2014/0267950 | A1* | 9/2014 | Kang | G06F 1/1652 |
| | | | | 349/12 |
| 2014/0368761 | A1 | 12/2014 | Lin et al. | |
| 2015/0022732 | A1* | 1/2015 | Park | G06F 3/044 |
| | | | | 349/12 |
| 2015/0062028 | A1* | 3/2015 | Go | G06F 1/1616 |
| | | | | 345/173 |
| 2015/0241924 | A1* | 8/2015 | Chang | G06F 3/044 |
| | | | | 349/12 |
| 2015/0242022 | A1* | 8/2015 | Hung | G06F 1/1615 |
| | | | | 345/174 |
| 2015/0309628 | A1* | 10/2015 | Chen | G02F 1/133305 |
| | | | | 428/68 |
| 2016/0109970 | A1* | 4/2016 | Aurongzeb | G06F 1/1643 |
| | | | | 345/173 |
| 2016/0109973 | A1* | 4/2016 | Kim | G06F 3/041 |
| | | | | 345/173 |
| 2016/0239133 | A1* | 8/2016 | Ko | G06F 1/1643 |
| 2016/0306462 | A1* | 10/2016 | Park | G06F 3/044 |
| 2016/0306476 | A1* | 10/2016 | Ko | G06F 3/0412 |
| 2016/0349878 | A1 | 12/2016 | Kim et al. | |
| 2016/0364044 | A1* | 12/2016 | Kim | H01L 51/0097 |
| 2017/0102738 | A1* | 4/2017 | Park | G06F 1/1652 |
| 2017/0123461 | A1* | 5/2017 | Kim | G06F 1/1641 |
| 2017/0185219 | A1* | 6/2017 | Kim | G06F 3/044 |
| 2017/0192572 | A1* | 7/2017 | Han | G06F 1/1618 |
| 2017/0212637 | A1* | 7/2017 | Choi | G06F 3/0418 |
| 2017/0269724 | A1* | 9/2017 | Son | G06F 3/041 |

* cited by examiner

TOUCH MEMBER AND METHOD OF MANUFACTURING THE SAME

CROSS-REFERENCE TO RELATED APPLICATIONS

This application claims priority from and the benefit of Korean Patent Application No. 10-2016-0019908, filed on Feb. 19, 2016, which is hereby incorporated by reference for all purposes as if fully set forth herein.

BACKGROUND

Field

Exemplary embodiments relate to a touch member and a method of manufacturing the same. More particularly, exemplary embodiments relate to a touch member and a method of manufacturing the same having an improved folding characteristic.

Discussion of the Background

Display devices provide information to users by displaying various images on display screens. Recently, foldable display devices with a bendable display member have been developed. Furthermore, such display devices are provided in a form including a display member and a touch member. Accordingly, the touch member may also be folded corresponding to the display member.

The touch member acquires coordinate information about a point at which a touch event occurs and inputs the acquired information. The display member is connected to the touch member and may thereby display an image corresponding to the information input from the touch member.

Unlike flat panel display devices, foldable display devices are foldable, rollable, and bendable, like paper. The foldable devices, having variously changeable shapes, may be easily carried and be more convenient for users. However, touch members used with foldable display devices have typically have poor folding characteristics (i.e., are too stiff and do not easily fold) or they have poor touch sensitive and are unreliable (e.g., electrical connections deteriorate after repeated use).

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a foldable touch member and a method of manufacturing the same which may maintain touch sensitivity while having improved reliability.

Additional aspects will be set forth in the detailed description which follows, and, in part, will be apparent from the disclosure, or may be learned by practice of the inventive concept.

An exemplary embodiment provides a touch member that includes a folding region folded around a folding axis and a non-folding region adjacent to the folding region. The touch member includes a first conductive pattern disposed in the folding region and a second conductive pattern disposed in the non-folding region. The touch member also includes an air gap defined inside the first conductive pattern. The touch member is configured to detect an external signal.

Another exemplary embodiment provides a method of manufacturing a touch member including forming a first pattern including a first layer including a first material, a second layer disposed on the first layer and including a second material, and a third layer disposed on the second layer and including a third material. The method also includes forming a mask pattern on the first pattern, forming a middle layer by etching portions not overlapping the mask pattern in the third layer, forming a first portion by etching portions exposed from the middle layer in the second layer, removing the mask pattern, forming a fourth layer including the second material on portions exposed from the first portion in the first layer and the middle layer, and forming a fifth layer including the first material on the fourth layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
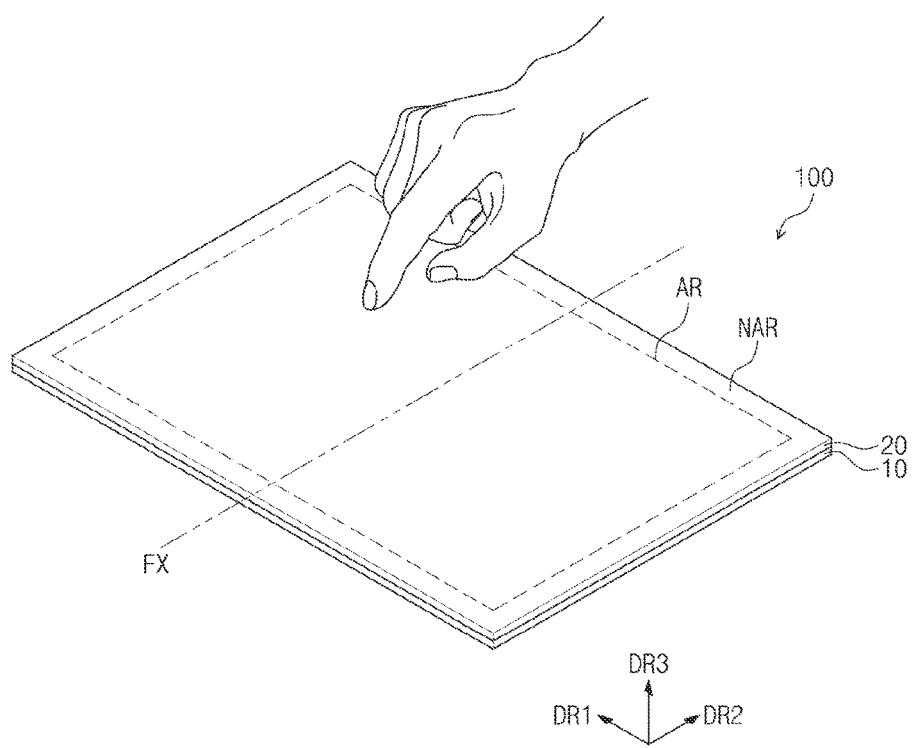
FIG. 1 is a perspective view of a touch member according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2A:
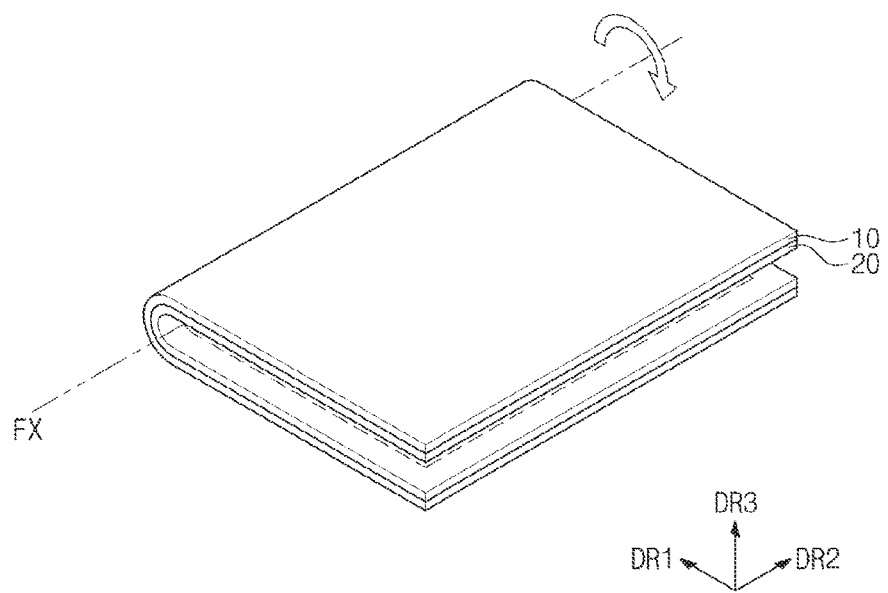
FIGS. 2A and 2B are perspective views illustrating a touch member according to an exemplary embodiment.
Figure 2B:
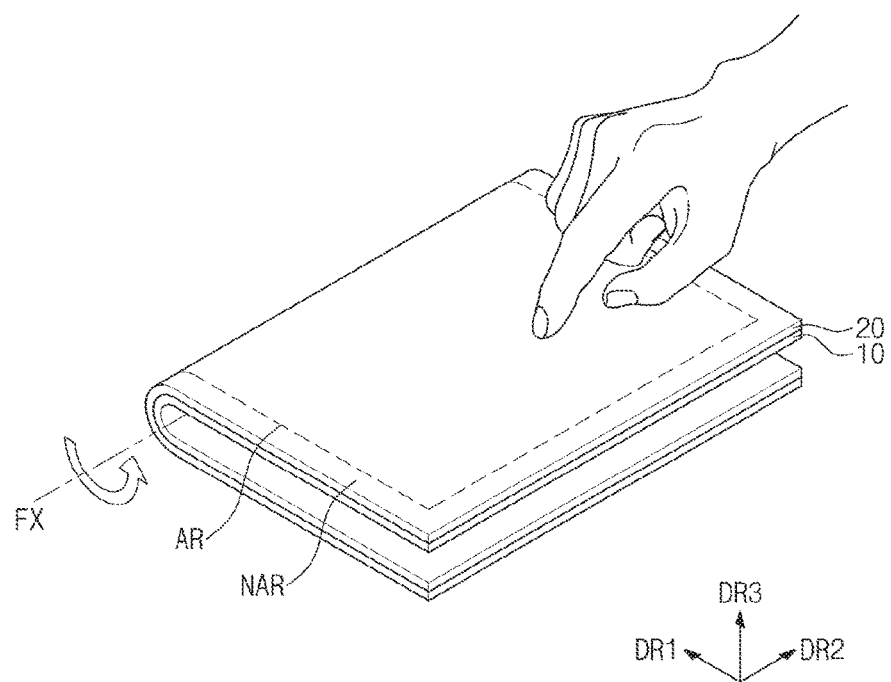

Hereinafter, exemplary embodiments of the inventive concept will be described in detail with reference to the accompanying drawings FIG. 1 is a perspective view of a touch member according to an exemplary embodiment. FIGS. 2A and 2B are perspective views illustrating a touch member according to an exemplary embodiment. FIG. 1 illustrates a touch panel 100 in an unfolded state, and FIGS. 2A and 2B illustrate the touch panel 100 in a folded state. Specifically, FIG. 2A illustrates the touch panel 100 in an in-folded state, and FIG. 2B illustrates the touch panel 100 in an out-folded state.

The touch panel 100 may include a base member 10 and a touch member 20.

The base member 10 may be a base layer on which the touch member 20 is disposed. For example, the base member 10 may be one insulating substrate or an insulating film.

Alternatively, the base member 10 may be a panel including a plurality of electrical elements and a plurality of insulating layers. When the base member 10 is a display member including a plurality of pixels, the touch panel 100 may be a touch screen panel. The base member 10 may include various embodiments, and the exemplary embodiment is not limited to any one example.

The touch member 20 detects an external touch signal provided to the touch panel 100. The touch signal may be provided through various methods. FIGS. 1 and 2B illustrate examples in which a touch signal input through a portion of user's body (e.g., a finger) is detected. However, the touch signal provided to the touch member 20 is not limited to any one method. For example, the touch signal may be input through one or more of various methods such as an optical method, body contact method, non-body contact method, or magnetic method.

The touch member 20 may be divided into an active region AR and a peripheral region or non-active region NAR in a plane defined by a first direction DR1 and a second direction DR2. When a touch signal is input to the active region AR, the touch member 20 may detect the touch signal to be activated.

The active region AR may be defined at a central portion of the touch member 20. Touch cells to be described later may be disposed in the active region AR. The touch cells may sense the touch signal provided to the touch member 20.

The touch member 20 may sense the touch signal through various methods. For example, the touch member 20 may be driven through an electrostatic capacitive method, a resistive film method, a coordinate recognition method, or the like. However, the exemplary embodiment is not limited to any one method. For example, the touch member 20 may be driven through various methods capable of sensing a touch signal.

The peripheral region NAR may be adjacent to the active region AR. The peripheral region NAR may surround the active region AR. In the current exemplary embodiment, the peripheral region NAR frames and surrounds the active region AR.

Driving lines and pads may be disposed in the peripheral region NAR. The driving lines and pays may apply an electrical signal to the touch cells or may transmit the electrical signal generated by the touch cells of the active region AR. The touch cells, the driving lines, and pads will be described later.

The touch panel 100 may be folded or unfolded around a folding axis extending in a predetermined direction. In the current exemplary embodiment, a folding axis FX extending in the second direction DR2 is defined in the touch panel 100.

As illustrated in FIGS. 1 and 2A, the touch panel 100 may be in-folded around the folding axis FX. Here, the active region AR is fold on itself and not exposed. The touch member 20 may be protected from external elements (e.g., external impact, water, or dirt) or external touches by being covered by the base member 10.

Alternatively, as illustrated in FIG. 2B, the touch panel 100 may be out-folded around the folding axis FX. Here, since the active region AR is exposed, the touch panel 100 may sense an external touch signal even in a folded state.

Figure 3A:
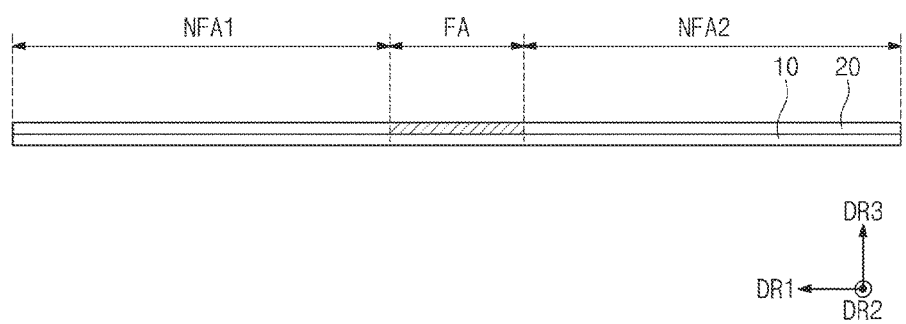
FIGS. 3A, 3B, and 3C are cross-sectional views of a touch panel according to an exemplary embodiment.
Figure 3B:
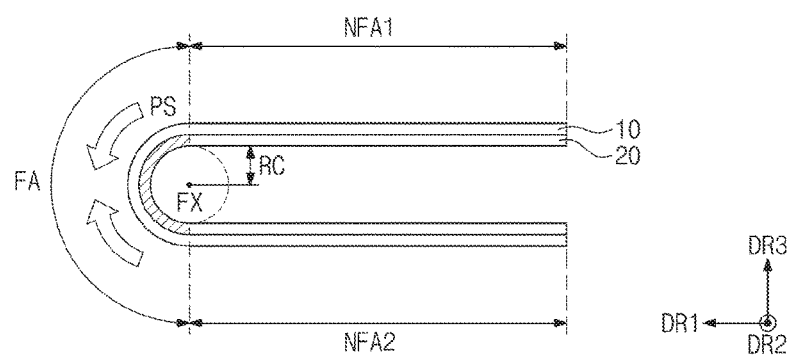
Figure 3C:
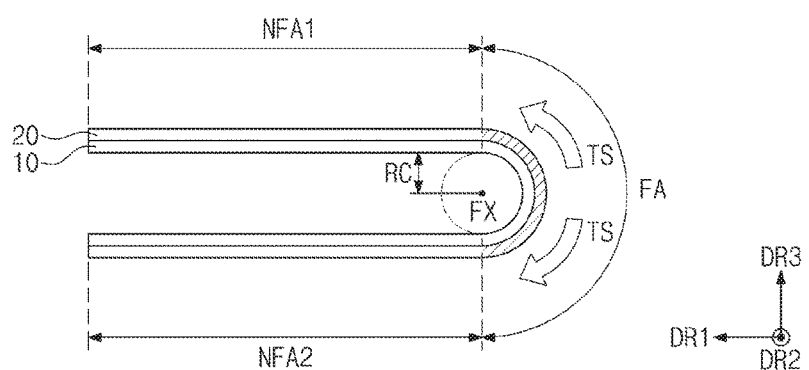

FIGS. 3A, 3B, and 3C are cross-sectional views of a touch panel according to an exemplary embodiment. FIG. 3A is a cross-sectional view of the touch panel illustrated in FIG. 1, and FIG. 3B is a cross-sectional view of the touch panel illustrated in FIG. 2A, and FIG. 3C is a cross-sectional view of the touch panel illustrated in FIG. 2B.

In the current exemplary embodiment, the touch member 20 may be divided into a plurality of regions according to its folding characteristics. The touch member 20 may be divided into a first non-folding region NFA1, a folding region FA, and a second non-folding region NFA2 which are arranged on a plane. For convenience, but by no means limiting, a portion of the touch member 20, the portion overlapping the folding region FA, is depicted by being hatched.

The folding region FA may be a region in which a folding stress due to folding is applied. The folding region FA may overlap the folding axis FX.

The portion in which the folding stress is applied may release the folding stress through deformation. Accordingly, the portion corresponding to the folding region FA of the touch member 20 may be easily deformed by the folding stress.

When the touch panel 100 is folded so as to have a predetermined radius of curvature around the folding axis FX, the folding stress may be applied in various forms according to various folding methods.

For example, as illustrated in FIG. 3B, when the touch panel 100 is in-folded, the folding stress corresponding to a compressive stress PS may be applied to the folding region FA.

Here, the touch member 20 disposed relatively further inside than the base member 10 becomes closer to the folding axis FX as being folded. Accordingly, deformation due to compressive stress PS may be easily generated in the folding region FA. The portion corresponding to the folding region FA of the touch member 20 may be contractively deformed by the compressive stress PS.

Alternatively, as illustrated in FIG. 3C, when the touch panel 100 is out-folded, the folding stress corresponding to a tensile stress TS may be applied to the folding region FA.

Here, the touch member 20 disposed relatively further inside than the base member 10 becomes farther from the folding axis FX. Accordingly, deformation due to the tensile stress TS may be easily generated in the touch member 20. The portion corresponding to the folding region FA of the touch member 20 may be expansively deformed by the tensile stress TS.

Referring again to FIGS. 3A, 3B, and 3C, first and second non-folding regions NFA1 and NFA2 may be defined so as to be spaced apart from each other with the folding region FA therebetween. Each of the first and second non-folding regions NFA1 and NFA2 may be a region to which a folding stress is not applied. Accordingly, deformation due to the folding stress may not be generated in each of the first and second non-folding regions NFA1 and NFA2. However, this is exemplarily illustrated, and a plurality of folding regions may also be defined in the touch panel 100. The touch member 100 may include various embodiments, and the exemplary embodiment is not limited to any one example.

Figure 4A:
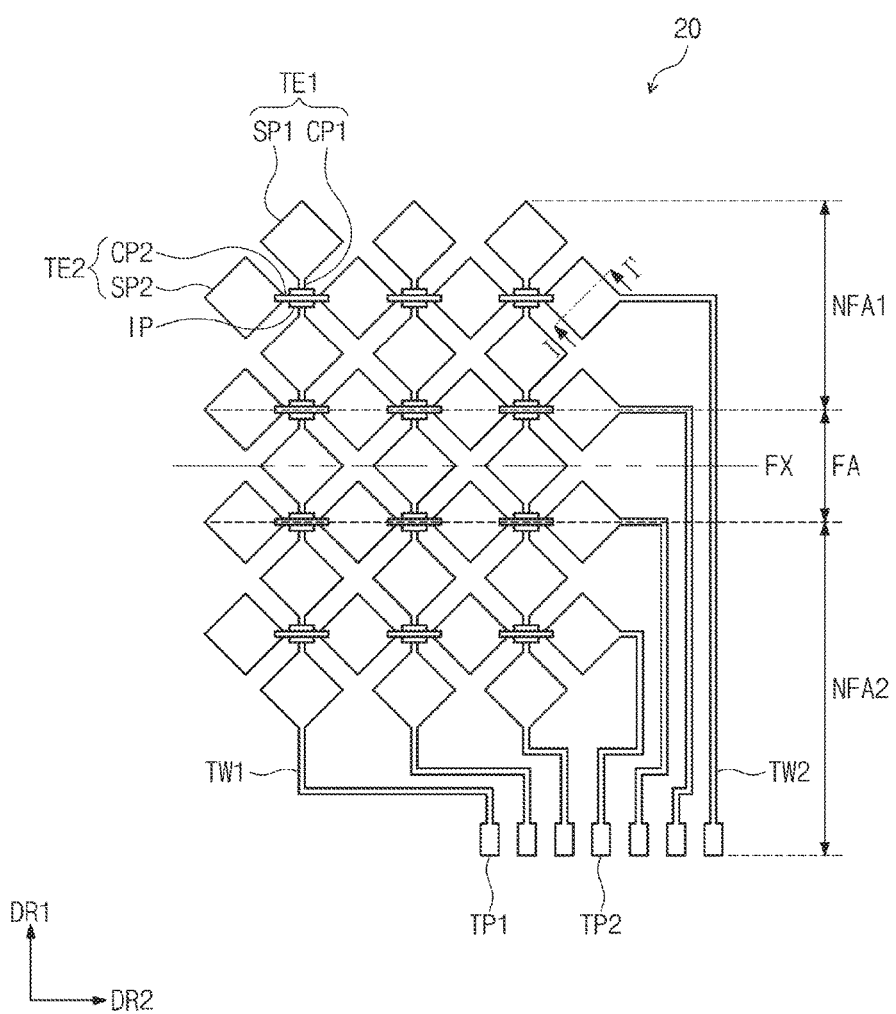
FIG. 4A is a plan view illustrating a touch member according to an exemplary embodiment.
Figure 4B:
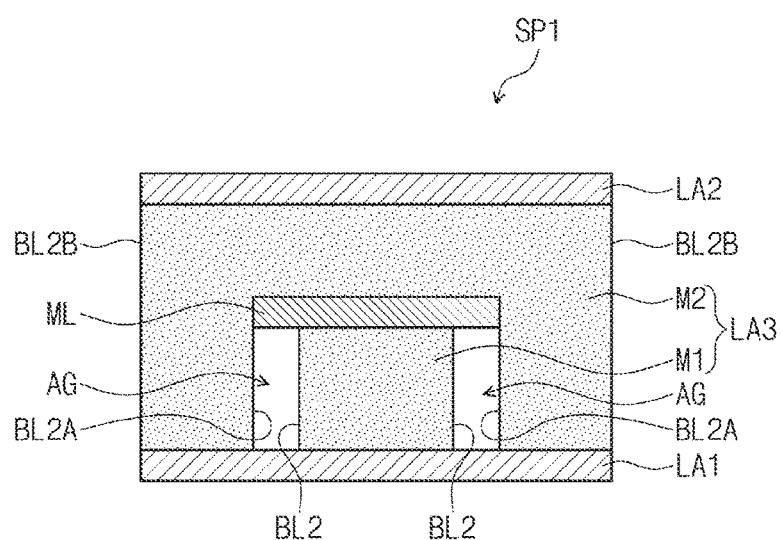
FIG. 4B is a cross-sectional view taken along line I-I' illustrated in FIG. 4A.

FIG. 4A is a plan view illustrating a touch member according to an exemplary embodiment. FIG. 4B is a cross-sectional view taken along line I-I' illustrated in FIG. 4A.

Hereinafter, a touch member according to an exemplary embodiment will be described in detail with reference to FIGS. 4A and 4B. Like reference numerals denote like elements in the same configuration as those illustrated in FIGS. 1 to 3C, and overlapping descriptions thereof will not be provided.

As illustrated in FIG. 4A, the touch member 20 includes a plurality of conductive patterns. The conductive patterns may include first touch electrodes TE1, second touch electrodes TE2, first driving lines TW1, second driving lines TW2, first pads TP1, and second pads TP2.

Although not shown, the first and second touch electrodes TE1 and TE2 may be disposed in an active region AR. (See FIG. 1). The first and second touch electrodes TE1 and TE2 may sense a touch signal provided in the active region AR.

The first touch electrodes TE1 may extend in a first direction DR1. The first touch electrodes TE1 may include a plurality of sensing patterns SP1 arranged in the first direction DR1 and a plurality of connecting patterns CP1 each arranged in the first direction DR1 and disposed between the sensing patterns SP1.

The second touch electrodes TE2 may extend in a second direction DR2. The second touch electrodes TE2 may have shapes which are different from those of the first touch electrodes TE1, or substantially the same shapes. For example, the second touch electrodes TE2 may include a plurality of sensing patterns SP2 arranged in the second direction DR2 and a plurality of connecting patterns CP2 each arranged in the second direction DR2 and disposed between the sensing patterns SP2.

The sensing patterns SP1 of the first touch electrodes TE1 and the sensing patterns SP2 of the second touch electrodes TE2 may be disposed on the same layer. In the current exemplary embodiment, the sensing patterns SP1 of the first touch electrodes TE1, the sensing patterns SP2 of the second touch electrodes TE2, and the connecting patterns CP1 of the first touch electrodes TE1 may be disposed on the same layer as each other.

The touch member 20 may further include a plurality of insulating patterns IP disposed between the connecting patterns CP1 of the first touch electrodes TE1 and the connecting patterns CP2 of the second touch electrodes TE2. The connecting patterns CP2 of the second touch electrodes TE2 and the connecting patterns CP1 of the first touch electrodes TE1 may cross with the insulating patterns IP disposed therebetween.

The first and second pads TP1 and TP2 may be disposed in a peripheral region NAR. The first and second pads TP1 and TP2 may be disposed so as to be adjacent to an edge of the touch member 20.

The first and second pads TP1 and TP2 may be a path electrically connecting the outside with the touch member 20. The touch member 20 may receive an electrical signal through the first pads TP1 and the second pads TP2 or may provide an electrical signal outside the touch member 20 through the first pads TP1 and the second pads TP2.

The first and second driving lines TW1 and TW2 may be disposed in the peripheral region NAR. The first driving lines TW1 may connect the first touch electrodes TE1 and the first pads TP1, and the second driving lines TW2 may connect the second touch electrodes TE2 and the second pads TP2.

The conductive patterns may be variously arranged in the folding region FA, a first non-folding region NFA1, and a second non-folding region NFA2. In the current exemplary embodiment, the first and second touch electrodes TE1 and TE2 and the second driving lines TW2 are disposed to overlap the folding region FA. However, all of the first driving lines TW1, the first pads TP1, and the second pads TP2 may also overlap the folding region FA, and the exemplary embodiment is not limited to any one example.

FIG. 4B exemplarily illustrates a first sensing pattern SP1. As illustrated in FIG. 4B, an air gap AG is defined inside the first sensing pattern SP1. In the current exemplary embodiment, two air gaps are defined in the first sensing pattern SP1.

The first sensing pattern SP1 may include a first conductive layer LA1, a second conductive layer LA2, a third conductive layer LA3, and a middle layer ML.

The first conductive layer LA1 may be disposed at the lowest side of the first sensing pattern SP1. For example, the first conductive layer LA1 may be disposed on an upper surface of a base member 10 which is not shown. (See FIG. 1).

The second conductive layer LA2 may be disposed over the first conductive layer LA1. The second conductive layer LA2 may have the same shape as the first conductive layer LA1 in plan view.

The second conductive layer LA2 may be formed of material having a high electrical conductivity. The second conductive layer LA2 may be formed of a material which is the same as or different from the material of the first conductive layer LA1.

The middle layer ML may be disposed spaced apart from the first and second conductive layers LA1 and LA2. The middle layer ML may be disposed within the third conductive layer LA3.

The middle layer ML may include a conductive material. For example, the middle layer ML may be formed of a material which is the same as the material of at least one of the first and second conductive layers LA1 and LA2 and is different from the material of the third conductive layer LA3.

When the middle layer ML has electrical conductivity, touch sensitivity of the touch member 20 may be improved because electrical characteristics of the first sensing pattern SP1 may be improved. The middle layer ML may be formed of conductive materials such as highly ductile metal, conductive polymers, and nano-structures, which not only have high flexibility, but also have etch rates different from that of a first portion M1. In this case, the touch member 20 may be applied to realize a flexible electronic device with improved touch sensitivity.

Alternatively, the middle layer ML may include an inorganic material. In this case, the inorganic material constituting the middle layer ML may have an etch rate different from that of a material constituting the first portion M1. For example, the middle layer ML may include silicon nitride ($SiN_x$), silicon oxide ($SiO_x$), or silicon oxynitride (SiON). However, the exemplary embodiment is not limited thereto. The middle layer ML may be formed of various materials having an etch rate different from that of a lower layer contacting the middle layer ML.

The third conductive layer LA3 may be disposed between the first and second conductive layers LA1 and LA2 in plan view. The third conductive layer LA3 may include a plurality of portions divided by the middle layer ML. In the current exemplary embodiment, the third conductive layer LA3 may include a first portion M1 and a second portion M2.

The first portion M1 may be disposed between the first conductive layer LA1 and the middle layer ML. The first portion M1 may have an area smaller than that of the middle layer ML in plan view. The middle layer ML may entirely cover the first portion M1, and an end of the middle layer ML may extend toward the outside from a side surface BL2 of the first portion M1.

The second portion M2 may be disposed between the first and second conductive layers LA1 and LA2 and between the middle layer ML and the second conductive layer LA2. The second portion M2 may be formed of a material which is the same as or different from that of the first portion M1, and the exemplary embodiment is not limited to any one example.

The second portion M2 may include an inner side surface BL2A facing the side surface BL2 of the first portion M1 and an outer side surface BL2B facing the inner side surface BL2A. The outer side surface BL2B, unlike the inner side surface BL2A, may be exposed to the outside of the first sensing pattern SP1.

The side surface BL2 of the first portion M1 and the inner side surface BL2A of the second portion M2 may be parallel to each other and are spaced apart from each other. An air gap AG may be defined between the side surface BL2 of the first portion M1 and the inner side surface BL2A of the second portion M2. The air gap AG may be surrounded by the lower surface of the middle layer ML, the side surface BL2 of the first portion M1, the upper surface of the first conductive layer LA1, and the inner side surface BL2A of the second portion M2. Accordingly, the first portion M1 and the air gap AG may be entirely covered by the middle layer ML.

The middle layer ML may be embedded in the second portion M2. Ends of the middle layer ML may contact the second portion M2. The inner side surface BL2A of the second portion M2 may be aligned to the ends of the middle layer ML. The middle layer ML may maintain a spacing distance between the first and second portions M1 and M2 to define the air gap AG.

However, the exemplary embodiment is not limited thereto. Each of the conductive patterns may have the same structure as the first sensing pattern SP1. Accordingly, at least one air gap may be defined inside each of the conductive patterns.

At least one air gap may be defined in a conductive pattern according to an exemplary embodiment. The air gap may function to release a folding stress applied to the conductive pattern. Accordingly, reliability of the touch member under the folding may be improved.

Figure 5A:
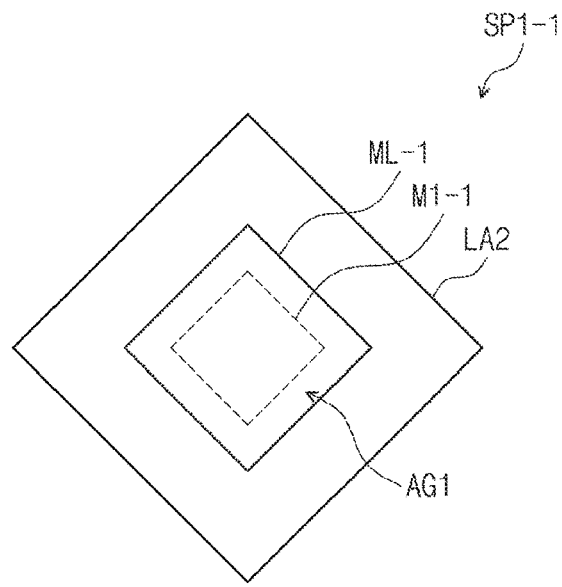
FIGS. 5A and 5B are plan views illustrating conductive patterns according to an exemplary embodiment.
Figure 5B:
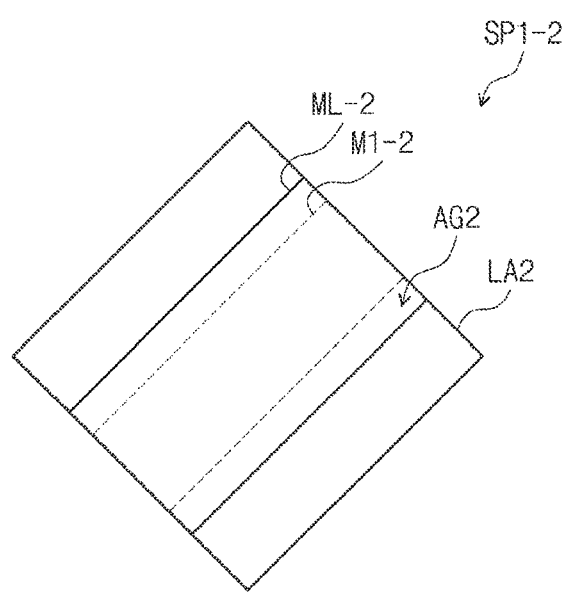

FIGS. 5A and 5B are plan views illustrating conductive patterns according to an exemplary embodiment. FIGS. 5A and 5B exemplarily illustrate first sensing patterns SP1-1 and SP1-2, respectively.

In addition, in FIGS. 5A and 5B, some components are not illustrated for convenience in description like reference numerals denote like elements in the same configuration as those illustrated in FIGS. 1 to 4B, and overlapping descriptions thereof will not be provided.

As illustrated in FIG. 5A, the first sensing pattern SP1-1 includes a middle layer ML-1 and a first portion M1-1 covered by the middle layer ML-1.

The middle layer ML-1 may have a concentric polygonal shape corresponding to a second conductive layer LA2. Since the area of the middle layer ML-1 may be greater than that of the first portion M1-1 and may be smaller than that of the second conductive layer LA2, the first portion M1-1, the middle layer ML-1 and the second conductive layer LA2 may have concentric rectangular shapes which have the same center and have gradually increasing areas.

Accordingly, an air gap AG1 may have a closed line shape surrounding the first portion M1-1 in plan view. The air gap AG1 may not be exposed to the outside of the first sensing pattern SP1-1.

Alternatively, as illustrated in FIG. 5B, a first sensing pattern SP1-2 includes a middle layer ML-2 extending in one direction and a first portion M1-2 corresponding to the middle layer ML-2. The middle layer ML-2 may extend from one side of the first sensing pattern SP1-2 to the other side of the first sensing pattern SP1-2.

The first portion M1-2 may have a shape corresponding to the middle layer ML-2 and has a cross-sectional area smaller than that of the middle layer ML-2. In the current exemplary embodiment, an air gap AG2 may have a linear shape extending in one direction. The air gap AG2 may be provided in plurality and defined to be spaced apart from each other with the first portion M1-2 therebetween.

At least one side of the air gap AG2 may be exposed to the outside of the first sensing pattern SP1-2. Accordingly, the air gap AG2 may have a tunnel shape extending in one direction.

In the current exemplary embodiment, the shape of each of the first sensing patterns SP1-1 and SP1-2 may be defined by the second conductive layer LA2. According to various exemplary embodiments, even though the shape of the second conductive layer LA2 is maintained, variously shaped air gaps may be defined according to the shapes of the middle layer ML-1 and the first portion M1-1.

Figure 6:
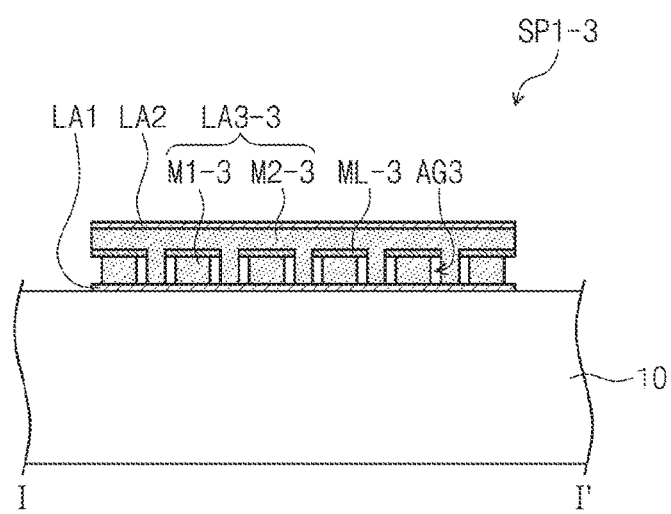
FIG. 6 is a cross-sectional view of a conductive pattern according to an exemplary embodiment.

FIG. 6 is a cross-sectional view of a conductive pattern according to an exemplary embodiment. FIG. 6 exemplarily illustrates a first sensing pattern SP1-3. However, the conductive patterns included in a touch member may have the same structure as the first sensing pattern SP1-3.

As illustrated in FIG. 6, the first sensing pattern SP1-3 may include a plurality of first portions M1-3 and a plurality of middle layers ML-3. The first portions M1-3 may be arranged to be spaced apart from each other in plan view.

The middle layers ML-3 may be disposed corresponding to each of the first portions M1-3. In plan view, the middle layers ML-3 may be arranged to be spaced apart from each other.

A second portion M2-3 may fill the space between the middle layers ML-3. The second portion M2-3 may be disposed to be spaced apart from the first portions M1-3.

Here, a plurality of air gaps AG3 may be defined inside the first sensing pattern SP1-3. The air gaps AG3 may be arranged alternately with some portions of the first portions M1-3 and the second portion M2-3.

The air gaps AG3 and the first portions M1-3 may be entirely covered by the corresponding middle layers ML-3. The more the air gaps are defined inside the first sensing pattern SP1-3, the more the reliability of the first sensing pattern SP1-3 is improved while under a folding stress.

The first sensing pattern SP1-3 according to an exemplary embodiment may include the plurality of middle layers ML-3 and the first portions M1-3, which are separated from each other while having the same shapes as the first sensing pattern SP1 illustrated in FIG. 4B, and thus may include a plurality of air gaps AG3 therein. The conductive pattern according to various exemplary embodiments may be provided therein with various numbers of air gaps through a simple change of the inner shape.

Figure 7:
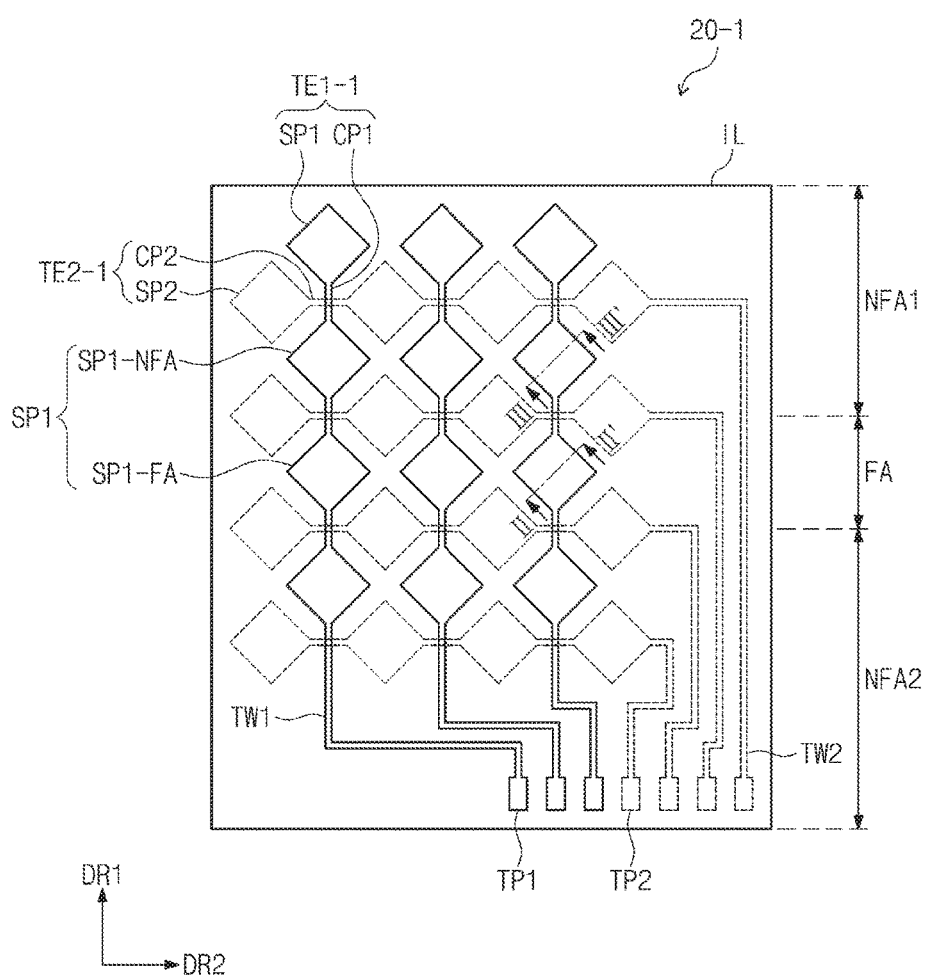
FIG. 7 is a plan view of a touch member according to an exemplary embodiment.
Figure 8A:
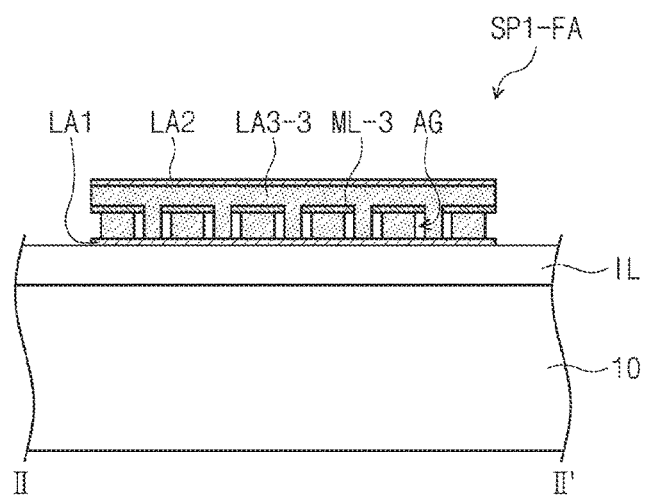
FIG. 8A is a cross-sectional view taken along line II-II' of FIG. 7.
Figure 8B:
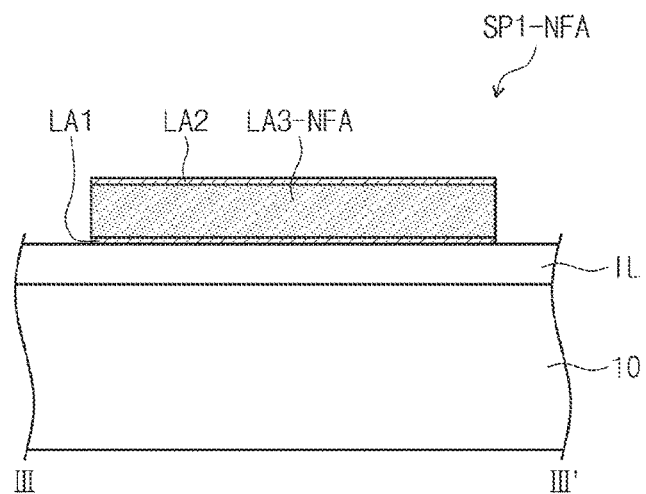
FIG. 8B is a cross-sectional view taken along line III-III' of FIG. 7.

FIG. 7 is a plan view of a touch member according to an exemplary embodiment. FIG. 8A is a cross-sectional view taken along line II-II' of FIG. 7. FIG. 8B is a cross-sectional view taken along line III-III' of FIG. 7.

Hereinafter, a touch member 20-1 according to an exemplary embodiment will be described in detail with reference to FIGS. 7, 8A, and 8B. Like reference numerals denote like elements in the same configuration as those illustrated in FIGS. 1, 2A, 2B, 3A, 3B, 3C, 4A, 4B, 5A, 5B, and 6, and overlapping descriptions thereof will not be provided.

As illustrated in FIG. 7, a touch member 20-1 may include conductive patterns and an insulating layer IL. The touch member 20-1 may include the conductive patterns disposed on various layers where some conductive patterns are disposed on layers different from other conductive patterns.

In the current exemplary embodiment, first touch electrodes TE1, first driving lines TW1, and first pads TP1 are disposed below the insulating layer IL, and second touch electrodes TE2, second driving lines TW2, and second pads TP2 are disposed above the insulating layer IL.

The touch member 20-1 may include multiple first sensing patterns SP1. The plurality of first sensing patterns SP1 may include first conductive patterns SP1-FA and second conductive patterns SP1-NFA, which are distinguished from each other according to disposition positions.

Referring to FIGS. 7 and 8A, the first conductive patterns SP1-FA are disposed in a folding region FA. The first conductive patterns SP1-FA may include air gaps AG therein. The first conductive patterns SP1-FA may have substantially the same structure as the first sensing pattern SP1-3 illustrated in FIG. 6. Accordingly, overlapping descriptions thereof will not be provided.

Referring to FIGS. 7 and 8B, second conductive patterns SP1-NFA are disposed in a non-folding region NFA1. The second conductive pattern SP1-NFA may include a first conductive layer LA1, a second conductive layer LA2, and a third conductive layer LA3-NFA.

The first conductive layer LA1 may be disposed on the insulating layer IL. The second conductive layer LA2 may be disposed over the first conductive layer LA1. In plan view, the first conductive layer LA1 may have substantially the same shape as the second conductive layer LA2. The first conductive layer LA1 and the second conductive layer LA2 of the second conductive pattern SP1-NFA may correspond to the first conductive layer LA1 and the second conductive layer LA2 of the first conductive pattern SP1-FA.

A third conductive layer LA3-NFA may be disposed between the first and second conductive layers LA1 and LA2. Air gaps may not be defined in the third conductive layer LA3-NFA. Accordingly, the third conductive layer LA3-NFA may be provided as a bulk type and thereby have substantially the same shape as the first and second conductive layers LA1 and LA2 in plan view.

According to an exemplary embodiment, the first conductive patterns SP1-FA (including the air gaps AG) of the touch member 20-1 are disposed in the folding region FA, and the second conductive patterns SP1-NFA are disposed in the non-folding region NFA1 and NFA2 which are less affected by a folding stress. Accordingly, the reliability of the touch member 20-1 may be improved in a region to which a folding stress is applied and degradation in the touch sensitivity of the touch member 20-1 may be prevented.

Figure 9:
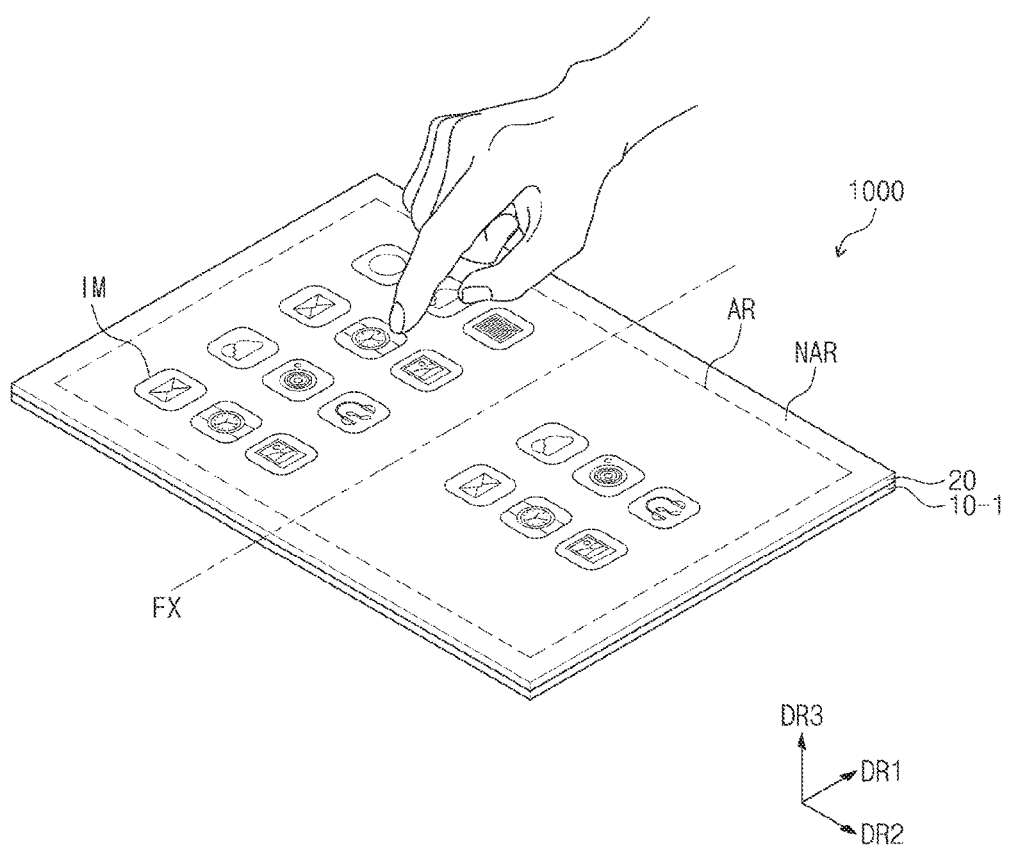
FIG. 9 is a perspective view of a touch screen device according to an exemplary embodiment.
Figure 10A:
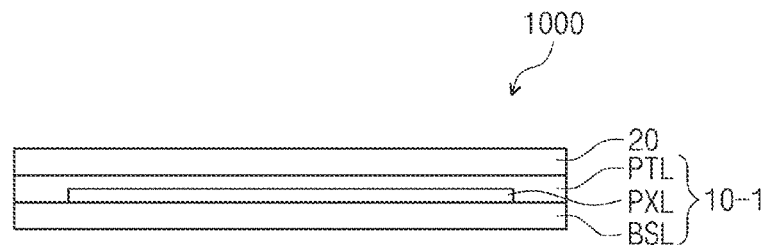
FIG. 10A is a schematic cross-sectional view illustrating the touch screen device illustrated in FIG. 9.
Figure 10B:
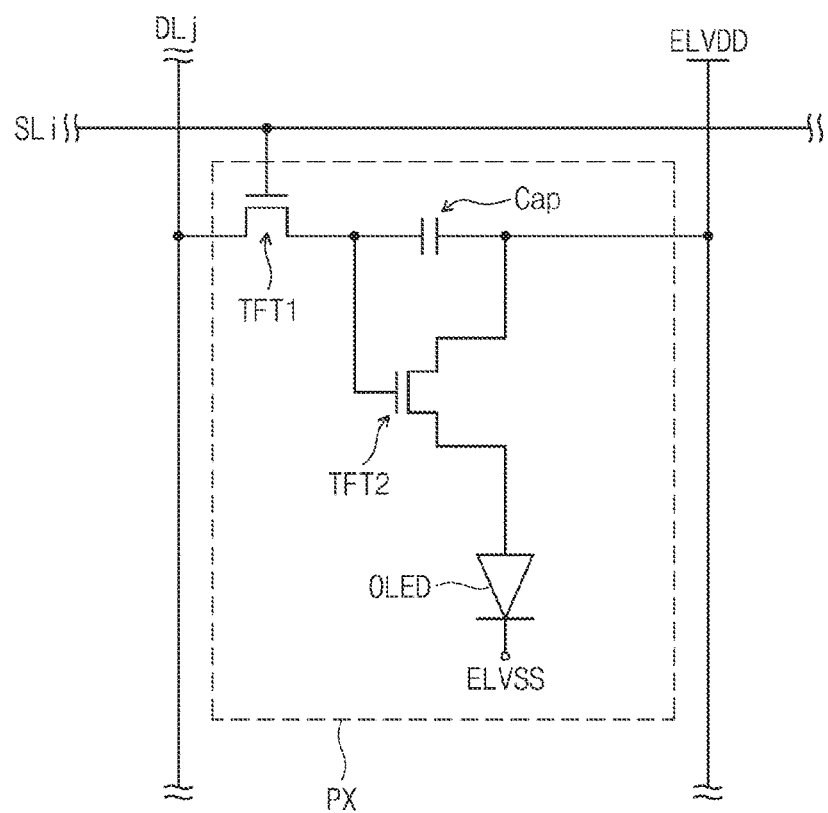
FIG. 10B is an equivalent circuit diagram illustrating one pixel of the touch screen device.

FIG. 9 is a perspective view of a touch screen device according to an exemplary embodiment. FIG. 10A is a schematic cross-sectional view illustrating the touch screen device illustrated in FIG. 9. FIG. 10B is an equivalent circuit diagram illustrating one pixel of the touch screen device.

Referring to FIGS. 9 to 10B, a touch screen device according to an exemplary embodiment will be described like reference numerals denote like elements in the same configuration as those illustrated in FIGS. 1, 2A, 2B, 3A, 3B, 3C, 4A, 4B, 5A, 5B, 6, 7, 8A, and 8B, and overlapping descriptions thereof will not be provided.

As illustrated in FIGS. 9 and 10A, a touch screen device 1000 includes a display member 10-1 and a touch member 20. The touch screen device 1000 may display an image IM on an active region AR and sense an external touch signal provided on the active region AR.

The display member 10-1 may include a base layer BSL, a pixel layer PXL, and a protective layer PTL. The base layer BSL may define the rear surface of the touch screen device 1000. The base layer BSL may be formed of a flexible material.

The pixel layer PXL may be disposed on the base layer BSL. The pixel layer PXL may include a plurality of pixels. The pixels may receive an electrical signal to produce an image IM.

The particular configuration of the pixel layer PXL may determine the type of the display member 10-1. The display member 10-1 may be any one of various display panels, such as a liquid crystal display panel, an organic light-emitting display panel, an electrophoretic display panel, an electrowetting display panel, or the like, which may display an image.

In the current exemplary embodiment, the display member 10-1 may be an organic light-emitting display panel. Accordingly, as illustrated in FIG. 10B, one pixel PX includes at least one thin film transistor, at least one capacitor, and at least one display element. In the current exemplary embodiment, the pixel PX may include a first thin film transistor TFT1, a second thin film transistor TFT2, one capacitor Cap, and an organic light-emitting element OLED.

The first thin film transistor TFT1 may include a control electrode connected to an ith scan line SLi, an input electrode connected to a jth data line DLj, and an output electrode. The first thin film transistor TFT1 may output a data signal applied to the jth data line DLj in response to a scan signal applied to the ith scan line SLi.

The capacitor Cap may include a first capacitor electrode connected to the first thin film transistor TFT1, and a second capacitor electrode receiving a first power supply voltage ELVDD. The capacitor Cap may charge to an amount corresponding to the difference between a voltage corresponding to a data signal received from the first thin film transistor TFT1 and the first power supply voltage ELVDD.

The second thin film transistor TFT2 may include a control electrode connected to the output electrode of the first thin film transistor TFT1 and the first capacitor electrode of the capacitor Cap, an input electrode receiving the first power supply voltage ELVDD, and an output electrode. The output electrode of the second thin film transistor TFT2 may be connected to the organic light-emitting element OLED.

The second thin film transistor TFT2 may control a driving current flowing through the organic light-emitting element OLED according to the amount of charge stored in the capacitor Cap. According to the amount of charge stored in the capacitor Cap, a turn-on time of the second thin film transistor TFT2 may be determined. Accordingly, the output electrode of the second thin film transistor TFT2 may provide the organic light-emitting element with a voltage level lower than that of the first power supply voltage ELVDD.

The organic light-emitting element OLED may include a first electrode connected to the second thin film transistor TFT2, and a second electrode receiving a second power supply voltage ELVSS. The organic light-emitting element OLED may include a light-emitting pattern disposed between the first and second electrodes.

The organic light-emitting element OLED may emit light during a turn-on interval of the second thin film transistor TFT2. The color of light generated in the organic light-emitting element OLED may be determined by a material constituting the light-emitting pattern. For example, the color of light generated in the organic light-emitting element OLED may be any one of red, green, blue or white.

Referring again to FIGS. 9 and 10A, the protective layer PTL is disposed on the pixel layer PXL to cover the pixel layer PXL. The protective layer PTL may electrically insulate the pixel layer PXL from the touch member 20 and vice versa.

For example, the protective layer PTL may be an encapsulating layer which encapsulates the pixel layer PXL. In this case, the protective layer PTL may include a plurality of laminated organic and/or inorganic films.

Alternatively, the protective layer PTL may be an encapsulating substrate which encapsulates the pixel layer PXL. In this case, the protective layer PTL may be a glass substrate or a plastic substrate.

Alternatively, the protective layer PTL may be a smoothing layer which smooths or levels the upper surface of the pixel layer PXL. The protective layer PTL according to an exemplary embodiment may be provided in various shapes. However, the exemplary embodiment is not limited thereto.

The touch member 20 may be disposed on the protective layer PTL. The active region AR of the touch member 20 may substantially overlap a region in which the pixel layer PXL is disposed.

The touch member 20 may include a touch cell including touch electrodes which sense an external touch signal, driving lines, and pads. The pads may be connected to the display member 10-1 or to an external power supply device. The touch member 20 of FIGS. 9 and 10A is substantially the same as the touch member 20 illustrated in FIG. 1. Accordingly, overlapping descriptions thereof will not be provided.

The touch member 20 may have a structure having improved reliability without specially affecting the display member 10-1 because air gaps are defined inside the conductive patterns. The touch screen device 1000 according to an exemplary embodiment may have improved reliability under a folding stress by including the touch member 20.

FIGS. 11A, 11B, 11C, 11D, 11E, 11F, and 11G are cross-sectional views illustrating a method of manufacturing a touch member according to an exemplary embodiment. Hereinafter, a method of manufacturing a touch member 20 will be described with reference to FIGS. 11A, 11B, 11C, 11D, 11E, 11F, and 11G.

Figure 11A:
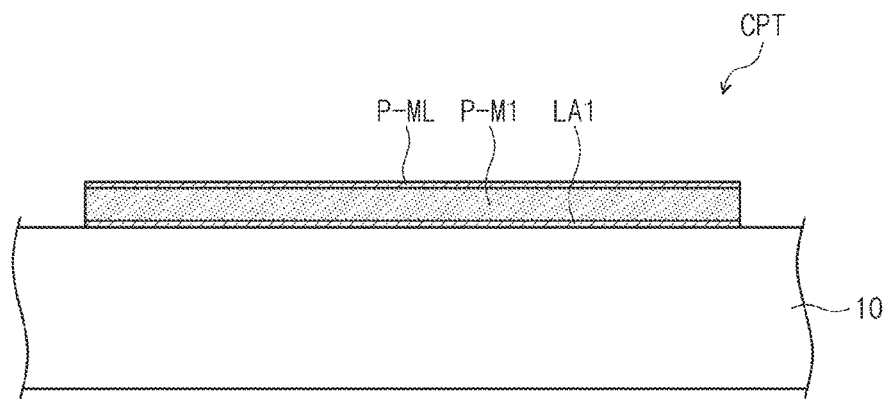
FIGS. 11A, 11B, 11C, 11D, 11E, 11F, and 11G are cross-sectional views illustrating a method of manufacturing a touch member according to an exemplary embodiment.

As illustrated in FIG. 11A, a predetermined conductive pattern CPT is formed on a base member 10. The conductive pattern CPT may include a first conductive layer LA1, a first pattern layer P-M1, and a second pattern layer P-ML.

On the base member 10, a first layer including a first material, a second layer including a second material, and a third layer including a third material may be sequentially formed. Then, the first, second, and third layers may be patterned to form the conductive pattern CPT.

In this case, the first, second, and third layers may be simultaneously patterned by using one mask. Accordingly, when in plan view, the first, second, and third layers may have the same shapes, and ends thereof may be aligned in one line.

Figure 11B:
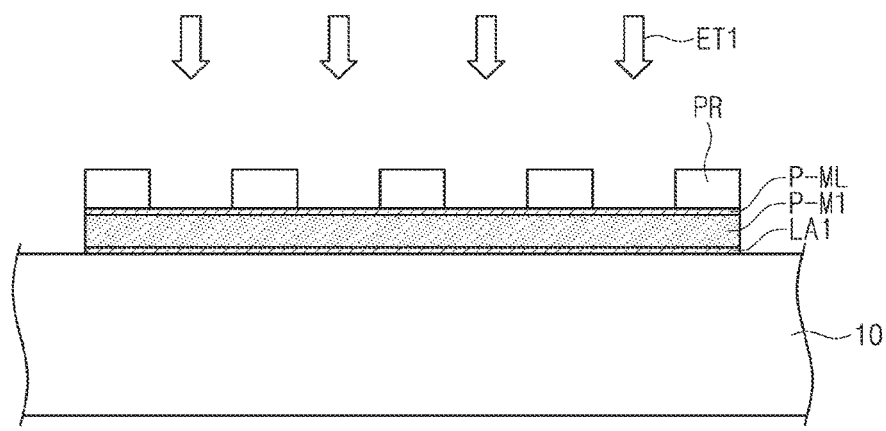
Figure 11C:
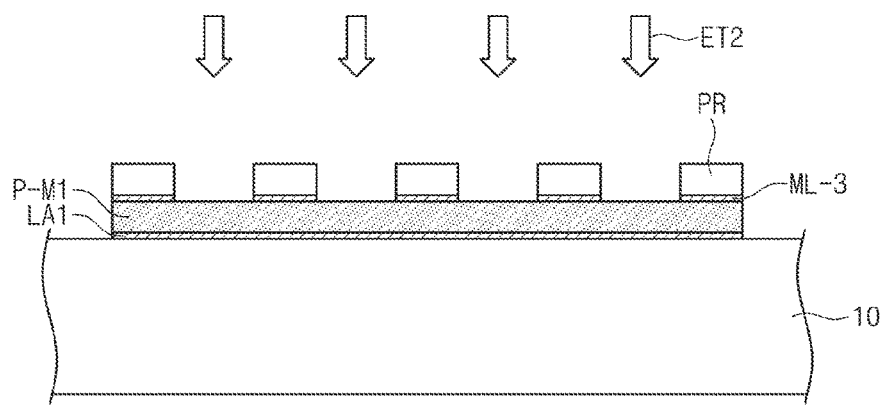

Subsequently, as illustrated in FIGS. 11B and 11C, the second pattern layer P-ML may be etched to form a middle layer ML-3. In this exemplary embodiment, a plurality of mask patterns PR are spaced apart a predetermined distance from each other and disposed on the second pattern layer P-ML.

A first etching gas ET1 may then be provided to pattern the second pattern layer P-ML. The second pattern layer P-ML may react with the first etching gas ET1 to be patterned into the middle layer ML-3 having a shape corresponding to each of the mask patterns PR, and portions not overlapping the mask patterns PR among the first pattern layer P-M1 are exposed to the out side.

Figure 11D:
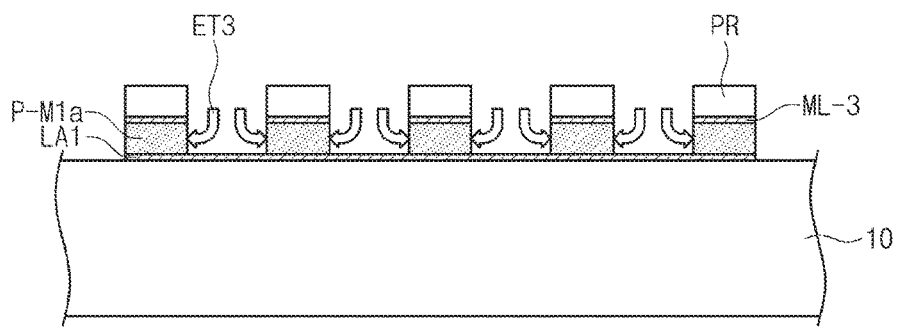

Subsequently, as illustrated in FIGS. 11C and 11D, the first pattern layer P-M1 may be etched to form a third pattern layer P-M1a. As a second etching gas ET2 is provided, portions not overlapping the mask patterns PR among the first pattern layer P-M1 may react with the second etching gas ET2, and thereby become etched.

Figure 11E:
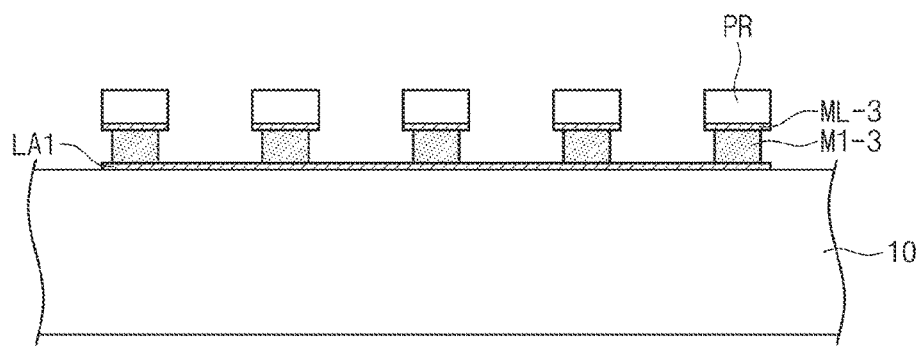

Subsequently, as illustrated in FIGS. 11D and 11E, the third pattern layer P-M1a may be further etched to form a first portion M1-3. Here, as a provided third etching gas ET3 may react with the third pattern layer P-M1a, the third pattern layer P-M1a may be under-cut toward the inside of the mask patterns PR in plan view. Accordingly, the side surface of the first portion M1-3 may be formed further inside than the outside of the middle layer ML-3.

The third pattern layer P-M1a and the middle layer ML-3 may also be formed of materials which have selected rates with respect to the third etching gas ET3. Materials of the third etching gas ET3, materials and the thickness of the third pattern layer P-M1a, and materials and the thickness of the middle layer ML-3 may be determined in consideration of respective selected etch rates.

For example, when the third pattern layer P-M1a is formed of aluminum (Al) and the middle layer ML-3 is formed of titanium (Ti), the third pattern layer P-M1a and the middle layer ML-3 may be controlled so as to have selected etch rates of about 1:1 to about 1:10 according to the third etching gas ET3. In addition, the more the fluoroform (CHF)-based gas or carbon tetrafluoride (CF4) gas is added to the third etching gas ET3, the more the selected etch rate between the third pattern layer P-M1a and the middle layer ML-3 increases.

Also, when the third pattern layer P-M1a is formed of aluminum, the higher the content of inorganic materials in the middle layer ML-3 for the same etching gas, the more the selected etch rate between the middle layer ML-3 and the third pattern layer P-M1a increases. For example, when including silicon nitride ($SiN_x$), silicon oxide ($SiO_x$) or silicon oxynitride (SiON), the middle layer ML-3 may have a higher selected etch rate with the third pattern layer P-M1a including aluminum.

The higher the selected etch rate between the middle layer ML-3 and the third pattern layer P-M1a, less damage to the middle layer ML-3 occurs (i.e., a reduction in etching to the middle layer ML-3) while the first portion M1-3 is formed. The method of manufacturing the touch member according to an exemplary embodiment may easily control the shape of the first portion M1-3 by controlling the selected etch rate between the middle layer ML-3 and the third pattern layer P-M1a.

The first to third etching gases ET1 to ET3 may be the same gas or different gases. When the first to third etching gases ET1 to ET3 are substantially the same gas, the process of forming the middle layer ML-3 and the process of forming the first portion M1-3 may be performed in one chamber. Accordingly, there are advantages in that process costs and a process time is reduced.

Figure 11F:
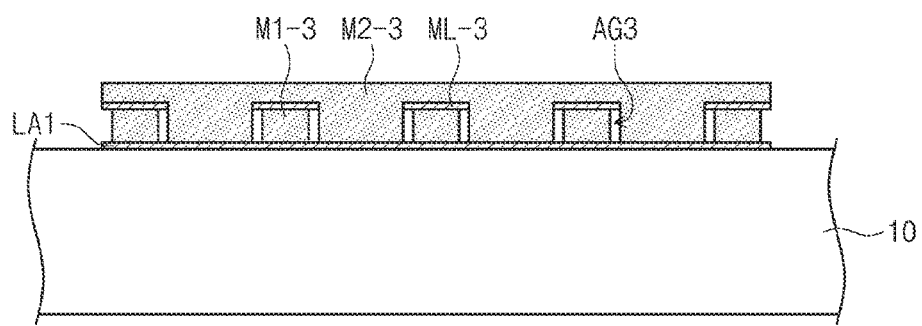

Subsequently, as illustrated in FIG. 11F, the mask patterns PR may be reduced or removed, and a second portion M2-3 may be formed. The second portion M2-3 may be formed so as to extend up to a region covering the middle layer ML-3 while filling the separated space from the middle layer ML-3.

Here, the second portion M2-3 may be formed to be aligned to ends of the middle layer M1-3. As the second portion M2-3 is formed to be spaced apart from the first portion M1-3 by means of the middle layer ML-3, air gaps AG3 may be defined between the second portion M2-3 and the first portion M1-3.

Figure 11G:
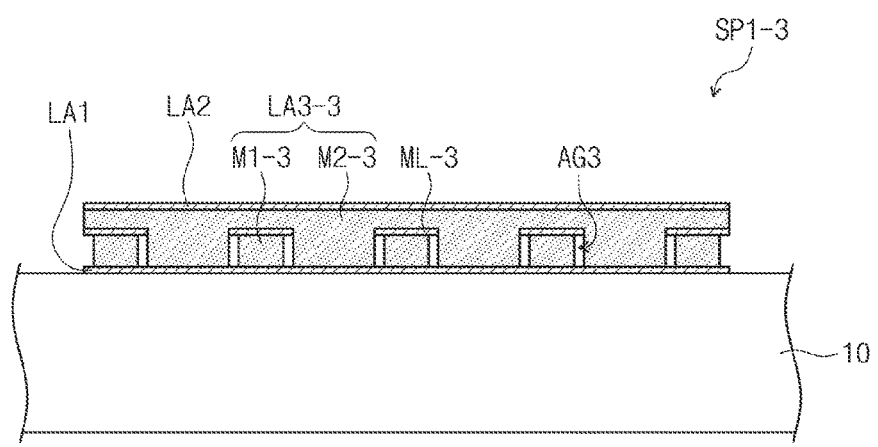

Subsequently, as illustrated in FIG. 11G, a second conductive layer LA2 is formed on the second portion M2-3 to form a conductive pattern SP1-3. The conductive pattern SP1-3 may correspond to the first sensing pattern SP1-3 illustrated in FIG. 6.

The second conductive layer LA2 may be formed by depositing a conductive material on the second portion M2-3. The second conductive layer LA2 may be formed of a material which is substantially the same as the first conductive layer LA1.

As described above, the method of manufacturing the touch member according to an exemplary embodiment may define air gaps inside the conductive pattern by controlling the selected etch rate. Accordingly, a touch member having an improved characteristic may be easily formed without changing a shape.

According to the inventive concept, a touch member having an improved folding characteristic while maintaining shapes of conductive patterns may be provided. In other words, applied folding stresses may be easily released by defining air gaps in the conductive patterns making it easier to fold the touch member and the display device having the touch member fold without electrical connections deteriorate. Accordingly, unnecessary stiffness is avoided against reliability of the touch member may be improved.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch member which detects an external signal, which is divided into a folding region folded around a folding axis and a non-folding region adjacent to the folding region in a plan view, the touch member comprising:
   a first conductive pattern disposed in the folding region and receiving a single signal; and
   a second conductive pattern disposed in the non-folding region,
   wherein an air gap is defined inside the first conductive pattern.

2. The touch member of claim 1, wherein:
   the first conductive pattern comprises:
      a first conductive layer;
      a second conductive layer disposed on the first conductive layer;
      a third conductive layer disposed between the first and second conductive layers; and
      a middle layer disposed within the third conductive layer and spaced apart from the second conductive layer in a cross-sectional view, and
   the air gap is surrounded by the middle layer, the first conductive layer and the third conductive layer.

3. The touch member of claim 2, wherein:
   the third conductive layer comprises:
      a first portion disposed between the first conductive layer and the middle layer; and
      a second portion disposed between the first and second conductive layers and between the middle layer and the second conductive layer, and
   the first and second portions are spaced apart from each other with the air gap therebetween.

4. The touch member of claim 3, wherein:
   the second portion comprises:
      a first side surface facing a side surface of the first portion; and
      a second side surface exposed to an outside of the first conductive pattern, and
   the air gap is defined by the side surface of the first portion, the first side surface, a lower surface of the middle layer, and an upper surface of the first layer.

5. The touch member of claim 4, wherein the air gap has a linear shape extending in one direction.

6. The touch member of claim 5, wherein the touch member comprises a plurality of air gaps spaced apart from each other with the first portion disposed therebetween.

7. The touch member of claim 3, wherein the air gap has a closed line shape surrounding the first portion in plan view.

8. The touch member of claim 3, wherein the first portion and the air gap are entirely covered by the middle layer in plan view.

9. The touch member of claim 8, wherein:
   the touch member comprises a plurality of first portions, a plurality of air gaps, and a plurality of middle layers, and
   each of the plurality of middle layers is disposed on the corresponding first portion from among the plurality of first portions.

10. The touch member of claim 9, wherein each of the plurality of middle layers entirely covers the corresponding first portion and at least one air gap adjacent to the corresponding first portion in plan view.

11. The touch member of claim 2, wherein the middle layer comprises an inorganic material.

12. The touch member of claim 2, wherein the middle layer comprises a conductive material.

13. The touch member of claim 12, wherein:
   the conductive material of the middle layer is the same as at least one of the first conductive layer and the second conductive layer, and
   the conductive material of the middle layer is different from the third conductive layer.

14. The touch member of claim 1, wherein:
   the touch member is divided into a first region in which the external touch signal is provided and a second region adjacent to the first region, and the touch member comprising:
      a touch cell comprising a plurality of touch electrodes disposed in the first region;
      a plurality of pads disposed in the second region; and
      a plurality of driving lines disposed in the second region and configured to connect the touch cell and the pads, and
   at least any one of the plurality of touch electrodes, the plurality of pads, and the plurality of driving lines is the first conductive pattern.

15. The touch member of claim 1, wherein the second conductive pattern has a same structure as the first conductive pattern.

16. A method of manufacturing a touch member, comprising:
   forming a first pattern comprising a first layer having a first material, a second layer disposed on the first layer and having a second material, and a third layer disposed on the second layer and having a third material;
   forming a mask pattern on the first pattern;
   forming a middle layer by etching portions not overlapping the mask pattern in the third layer;
   forming a first portion by etching portions exposed from the middle layer in the second layer;
   removing the mask pattern;
   forming a fourth layer comprising the second material on portions exposed from the first portion in the first layer and the middle layer; and
   forming a fifth layer comprising the first material on the fourth layer.

17. The method of manufacturing a touch member of claim 16, wherein:
   the middle layer is aligned to the mask pattern in plan view, and
   the first portion is formed by being inwardly under-cut from a side surface of the middle layer in plan view.

18. The method of manufacturing a touch member of claim 17, wherein:
   the first portion is etched by a first etching gas, and
   an etch rate of the first portion to the first etching gas is greater than an etch rate of the middle layer to the first etching gas.

19. The method of manufacturing a touch member of claim 18, wherein:
   the first material comprises a metal, and
   the third material comprises at least one of silicon oxide, silicon nitride, and silicon oxynitride.

20. The method of manufacturing a touch member of claim 18, wherein the third material is a conductive material.

\* \* \* \* \*